United States Patent [19]

Eelman

[11] Patent Number: 4,622,099
[45] Date of Patent: Nov. 11, 1986

[54] METHOD AND APPARATUS FOR MANUFACTURING PAPER AND BOARDS

[75] Inventor: Pieter Eelman, Finsterwolde, Netherlands

[73] Assignee: J. M. Voith GmbH, Heidenheim, Fed. Rep. of Germany

[21] Appl. No.: 740,318

[22] Filed: Jun. 3, 1985

Related U.S. Application Data

[63] Continuation of Ser. No. 557,744, Dec. 2, 1983, abandoned.

[51] Int. Cl.$^4$ .......................... D21B 1/32; D21C 5/02
[52] U.S. Cl. ........................................ 162/4; 162/261; 241/46.17; 366/219; 366/185
[58] Field of Search .............. 162/4, 5, 261, 55, 380; 366/185, 187, 233, 219; 241/101 B, 46.17

[56] References Cited

U.S. PATENT DOCUMENTS

| | | | |
|---|---|---|---|
| 1,674,989 | 6/1928 | Powell | 366/185 |
| 3,752,445 | 8/1973 | Nowak | 366/187 |
| 4,194,968 | 3/1980 | Pfalzer et al. | 162/4 |
| 4,385,997 | 5/1983 | Strudal | 162/4 |
| 4,397,713 | 8/1983 | Lambrecht | 162/4 |
| 4,465,591 | 8/1984 | Holz et al. | 162/4 |

FOREIGN PATENT DOCUMENTS 2751084 12/1978 Fed. Rep. of Germany .......... 162/4
2063325 6/1981 United Kingdom .

Primary Examiner—S. Leon Bashore
Assistant Examiner—K. M. Hastings
Attorney, Agent, or Firm—Grimes & Battersby

[57] ABSTRACT

A method is provided for manufacturing an end product such as, for example, paper or board from a fibrous base material such as waste paper. The method includes the steps of introducing into a pre-soaking device the fibrous base material and admixing such base material with a sufficient predetermined quantity of water to form a fibrous mixture. Controlled amounts of the mixture are thereupon introduced into a pulper and admixed with a quantity of water greater than the quantity of water introduced into the pre-soaking device so as to form a fibrous suspension. The fibrous suspension is then transported to a subsequent processing station for further processing into the desired end product.

The pre-soaking device includes a mixing container, preferably a cylinder, mounted on a support frame and adapted to be tilted so as to discharge a variable amount of mixture from the cylinder as a function of the angle of inclination of the cylinder. The support frame is adapted to tilt the cylinder downwardly at its discharge end for delivery of the mixture to a conveyor belt for transmittal to a pulper. The support frame includes carrying rollers to permit the cylinder to be rotated in order to agitate and mix the mixture.

15 Claims, 1 Drawing Figure

U.S. Patent  Nov. 11, 1986  4,622,099
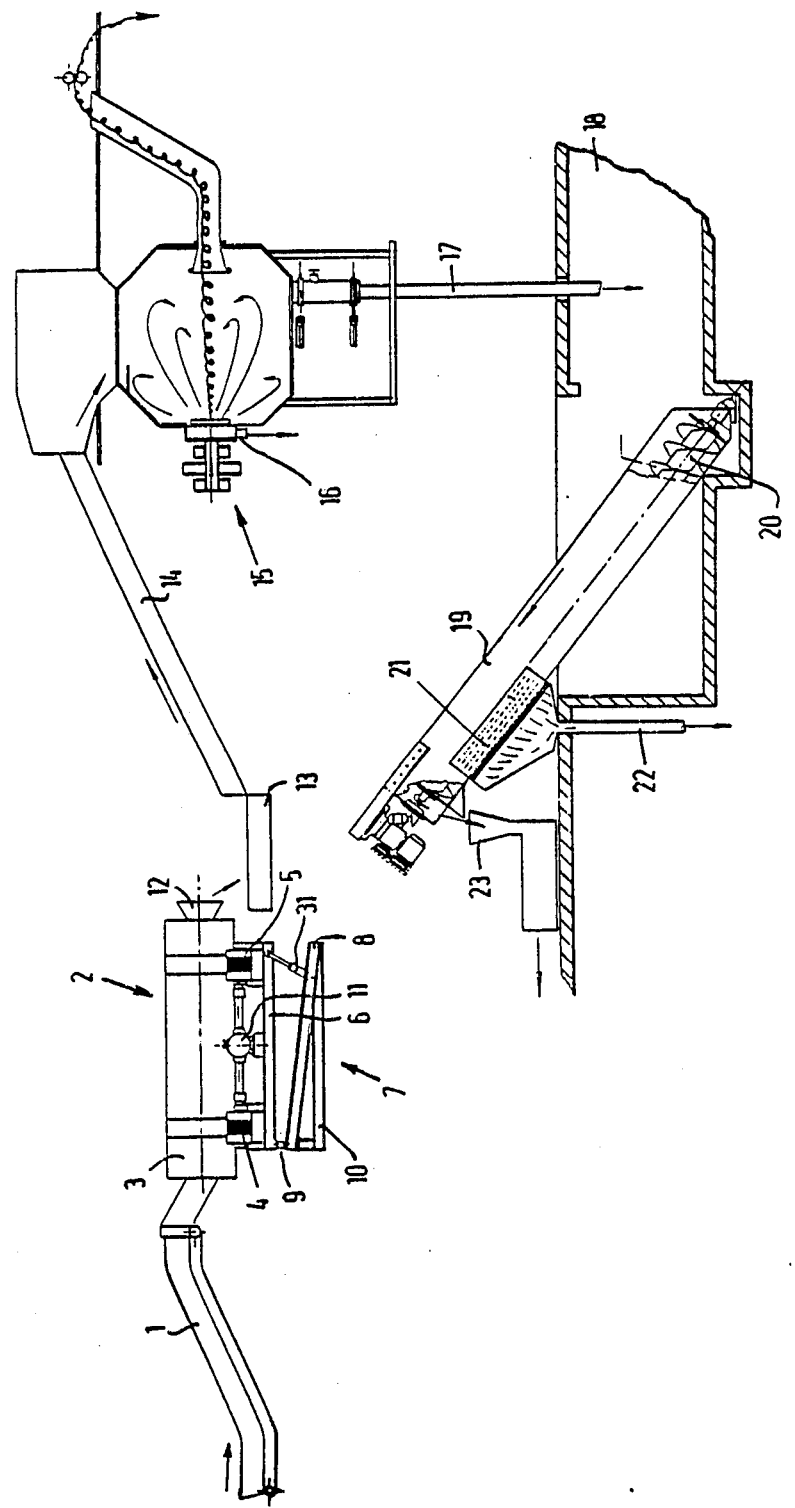

METHOD AND APPARATUS FOR MANUFACTURING PAPER AND BOARDS

This application is a continuation of application Ser. No. 557,744, filed Dec. 2, 1983 now abandoned.

BACKGROUND OF THE INVENTION

The present invention relates generally to method and apparatus for use in the manufacture of paper and/or board products and, more particularly, to method and apparatus wherein a fibrous base material such as, for example, waste paper, is first admixed with water in a pre-soaking device to form a fibrous mixture which is then transported to a pulper device wherein additional water is added to form an aqueous fibrous suspension. The aqueous fibrous suspension is then purified, treated further and thereupon transmitted to subsequent paper or board fabricating machines for further finish processing and fabrication into the desired paper or board product.

In the manufacture of paper or board products from fibrous base materials, particularly from waste paper or the like, the fibrous base materials during processing are defibrated which results in the fibers being released from the structures which cohere with and about them. The fibers then accumulate as a suspension in water and serve as the base material for the respective paper or board processing apparatus.

Defibering, even when waste paper is used as the base material, is effected in a pulper, i.e., a large container which includes an agitator which serves to violently agitate a mixture of waste paper and water so as to produce the desired fibrous suspension. A pulper of the type heretofore used, due in large part to the degree of agitation required, and the attendant technical requirements therefore, requires the expenditure of substantial amounts of energy in order to operate efficiently. Consequently, such apparatus is extremely expensive to manufacture and maintain.

OBJECTS AND SUMMARY OF THE INVENTION

It is therefore an object of the present invention to provide novel method and apparatus for use in manufacturing paper and/or board products from a fibrous base material.

It is another object of the present invention to provide such method and apparatus which employs a pulper, the energy efficiency of which is greater than methods heretofore used.

It is yet another object of the present invention to provide such method and apparatus which employs an apparatus which has an improved output.

It is still yet another object of the present invention to provide such method and apparatus which employs apparatus with increased dissolving power over prior art installations.

The apparatus of the subject invention employs a pre-soaking device, i.e., a mixer, container, means for feeding fibrous base material and water into the mixing container in order to form a mixture, discharge means for removing the resultant mixture, conveyor means for transporting the mixture, and regulating means for regulating the quantity of the mixture to be removed from the mixing container. The position of the mixing container relative to the horizontal is adjustable. Adjusting means are provided for regulating or otherwise controlling and fixing the inclination of the mixing container relative to a horizontal line such that the quantity of mixture to be discharged is controllable due to the cooperation of the adjusting means and the discharge means.

The subject apparatus is based on the recognition that the regulation of the mass of quantity of the material to be discharged from the mixing container and provided for feeding to the pulper offers, in the form of rotating motion, the possibility of removing the mixture produced in the mixing container. Due to the manner in which it is formed, this may be accomplished in a well controlled manner and in such a way that there is no danger of clogging the removed devices.

The pre-soaking device, i.e., the mixing container, consists of an elongated cylindrical container, the front wall of which includes a circular discharge opening whose diameter is less than the diameter of the cylindrical container. The mixing container is mounted on rollers which permit it to be continuously rotated about its longitudinal axis. Adjusting means are provided for regulating the inclination of the mixing container as it rotates about an axis which is perpendicular to a horizontal line, i.e., between a first position where the longitudinal axis connects with the horizontal line and a second position where the longitudinal axis at the discharge side points downwardly. During operation of the mixing container in its horizontal position, no material can be removed from the container due to the horizontal positioning of the mixing container.

The pre-soaking device of the present invention may include means for adjusting the angle of inclination. The mixing cylinder is mounted on a lower flat frame oppositely extending from the horizontal line and having a constant inclination angle and an upper frame which includes adjusting means. The upper frame is pivotably connected about the horizontal axis to the lower frame by a hinge and the horizontal axis is located at a predetermined distance from the lowermost point of the lower frame. Means are preferably provided on the upper frame for permitting the mixing cylinder to rotate continuously about the longitudinal axis with the discharge opening being located at the lowermost point of the lower frame. Adjusting means, preferably in the form of adjustable hydraulic cylinders, are provided for regulating the angle of inclination of the mixing container. The adjusting means are preferably provided between the lower and upper frames.

Embodied as a frame-like, flat construction, the upper frame can, as a structure supporting the mixing container, include carrying rollers. A motor, preferably a controllable electro-motor, is provided for rotating the mixing container about its longitudinal axis using suitable transmission elements as drive means. It is preferable to position or mount the carrying rollers and the device transfer means on the upper frame. This permits regulation of the motion. Further, the inclination of the upper frame in the drive and transfer means are engaged in such a way that the container is continuously driven during removal of the mixture from the mixing container.

It was found that by pre-soaking the fiber material in the pre-soaking device in advance of the pulper with the higher water temperature utilized therein, the energy consumption is increased from 40KW to 460KW and the dissolving power is increased by more than 100%.

The novel features which are considered as characteristic of the invention are set forth in particular in the appended claims. The improved method and apparatus, both as to construction and mode of operation, together with additional features and advantages thereof, will be best understood upon review of the following detailed description of certain specific embodiments with reference to the accompanying drawings.

BRIEF DESCRIPTION OF THE DRAWING

The Figure illustrates in diagrammatic fashion the method and apparatus of the device of the subject invention.

DETAILED DESCRIPTION OF THE PREFERRED EMBODIMENTS

The apparatus of the subject invention is illustrated schematically in the Figure wherein the fibrous base material, preferably waste paper, is introduced through a conveyor belt 1 into a pre-soaking device 2 in predetermined and controlled amounts. The pre-soaking device includes a generally cylindrical mixing container 3 which is mounted on two and preferably four pair of carrier rollers 4 and 5 which are arranged on an upper frame 6 of an angle adjusting device 7. Carrier rollers 4 and 5 are adapted to cause the mixing cylinder to rotate to effect mixing of its contents. The angle adjusting device further includes a lower frame 8 which is connected to upper frame 6 by a hinge 9. A horizontally stable support frame 10 is further provided and serves to support or otherwise steady lower frame 8.

Agitation or mixing of the base material within the mixing container 3 is effected by a motor 11, preferably an electro-motor, which is connected to the carrier rollers 4 and 5 by transfer means (not shown) which can include, for example, a chain-transmission link device. The mixing container 3 is so mounted on the rollers 4, 5 as to permit rotation about the longitudinal axis of the mixing container 3 during the pre-soaking process.

Hydraulic cylinders 31 are provided between the lower frame 8 and the upper frame 6 and serve to downwardly pivot the mixing container 3 from the horizontal position shown in the Figure by pivoting and therefore changing the inclination angle of the upper frame 6 at the hinge 9. This downward pivoting of the mixing container 3 from the horizontal serves to facilitate delivery of the pre-soaked base material through discharge opening 12 into container 13 after completion of the pre-soaking step. Discharge opening 12 has a smaller diameter than the diameter of the mixing container 3. The pre-soaked fibrous base material drained into container 13 from mixing container 3 has a solids content of between about 20% and about 30% depending upon the angle of inclination of the mixing container 3 relative to the container 13, the flow velocity of base material into container 13 and the number of revolutions of the mixing container 3. By adjusting the angle of inclination, the amount of mixture delivered from mixing container 3 to container 13 may be controlled.

The mixture is thereupon transported from container 13 to pulper 15 by conveyor belt 14 wherein the mixture is further defibered and cleaned with additional agitation and, if necessary, with the further addition of water, typically in an amount greater than the amount of water introduced into the mixing container 3. The speed of the conveyor belt 14 may be constant or variable. The fiber suspension is then drawn off and removed through an extraction conduit 16. Water and separated dirt or other pollutants and contaminants may be periodically drawn off through heavy duct outlet 17 into a catch container 18.

The water and separated dirt introduced into container 18 is guided up and into seive 21 by the use of worm screw 20 which rotates in container 19. The separated water can thereupon be lead off through a conduit 22 to a purification plant while the contaminants are passed off into a collection container 23 and transported to a waste paper press (not shown). Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

Wherefore I claim:

1. A method for forming a fibrous suspension from a fibrous base material of waste paper, said method comprising the steps of:

introducing into rotating pre-soaking device the fibrous base material and admixing said base material with a sufficient predetermined quantity of water to form a fibrous mixture, said pre-soaking device being rotatably mounted about its longitudinal axis and including a tiltable support frame for adjusting the angle of inclination of said device at multiple positions about an axis of rotation; and introducing into a pulper a controlled amount of the fibrous mixture by downwardly pivoting the rotating pre-soaking device from a horizontal position to a downwardly projecting position so as to cause a controlled amount of the mixture to flow into conveyor means for conveying the mixture into the pulper and admixing said mixture with a further quantity of water so as to form a fibrous suspension.

2. The method of claim 1 wherein the water introduced into said pre-soaking device is warm water.

3. The method of claim 1 wherein the mixture is defibered and cleaned in the pulper.

4. The method of claim 1 wherein the mixture produced in the pre-soaking device possesses a dry pulp content and wherein said content is controllable.

5. The method of claim 1 wherein the temperature of the mixture is controllable.

6. Apparatus in association with a pulper for processing a fibrous base material of waste paper into a fibrous suspension, said apparatus comprising a mixing container rotatably mounted about its longitudinal axis on a tiltable support frame, feed means for introducing the fibrous base material and water into said mixing container so as to form a mixture, discharge means for discharging the mixture from the mixing container, conveying means for conveying the mixture to the pulper, control means for regulating the amount of the mixture produced in the mixing container and adjusting means which operate in cooperation with said frame for fixably establishing the angle of inclination of the mixing container relative to a horizontal line, wherein said adjusting means and said discharge means cooperate to control the amount of mixture discharged from the mixing container, and wherein the adjusting means are structured so that the inclination of the mixing container can be adjusted at various positions about an axis of rotation which is perpendicular to the longitudinal axis from a position in which the longitudinal axis coincides with the horizontal line to a position wherein the longitudinal axis is tilted downwardly at the discharge side.

7. The apparatus of claim 6 wherein said mixing container comprises an elongated cylinder having two opposed end walls.

8. The apparatus of claim 7 wherein said discharge means comprises an annulus having a discharge opening contained on at least one of the two end walls and wherein the diameter of the discharge opening is smaller than the diameter of the cylinder.

9. The apparatus of claim 6 wherein the support frame includes upper and lower frames.

10. The apparatus of claim 9 wherein the inclination angle of the lower frame is constant relative to the horizontal line.

11. The apparatus of claim 10 wherein the upper frame is interconnected with said lower frame and adapted to be pivoted about a horizontal axis.

12. The apparatus of claim 11 wherein the frames are interconnected by a hinge.

13. The apparatus of claim 9 wherein the upper frame includes angle adjusting means and means for causing said container to rotate around its horizontal longitudinal axis.

14. The apparatus of claim 9 wherein the discharge opening is positioned at the lower side of the lower frame.

15. The apparatus of claim 13 wherein the angle adjusting means comprise hydraulic cylinders positioned between the two frames.

* * * * *